Patented Dec. 23, 1952

2,622,982

UNITED STATES PATENT OFFICE 2,622,982

WHEY TREATMENT

Sue C. Stevens, Dayton, Ohio, assignor to Swift & Company, Chicago, Ill., a corporation of Illinois No Drawing. Application June 25, 1949,
Serial No. 101,501

3 Claims. (Cl. 99—19)

This invention relates to whey treatment, and more particularly to a process of removing the characteristic objectionable flavor of whey so as to render it suitable for incorporation into food products in appreciable quantities.

When whey is incorporated into a food product, it usually imparts thereto an objectionable flavor. In accordance with the present invention, I have found that aqueous acetone may be employed to extract from concentrated or dried whey the substances which impart the characteristic objectionable flavor. The amount of material extracted from whey by using acetone diluted with water is a very small percentage of the total whey solids and contains mainly lactose, protein, and inorganic salts which produce ash. The extracted material also contains the compounds which impart the characteristic disagreeable flavor to whey and has a bitter, caramelized, and very salty flavor, but the exact nature of the flavor-imparting compounds is not known.

The preferred process is to employ acetone containing approximately 30% water by weight at room temperatures, i. e., 70° to 90° F., to extract dried whey powder; but it is apparent that substantially water-free acetone may be employed to extract a concentrated whey containing a substantial amount of water, the acetone being diluted by the water contained in the whey concentrate. Most of the whey solids are insoluble in the acetone-water mixture, and the insoluble solids are easily separated from the extract by filtration or by centrifuging in a basket-type centrifugal separator. The extracted whey when dried and ground has a light creamy color, is easily suspended in water, and has a slightly sweet flavor. Any residual acetone is vaporized from the whey solids during the drying operation. Since only a small amount of material is removed during the extraction process, the extracted whey has a composition very similar to the original whey except for the removal of small amounts of flavor-imparting materials. In addition to its direct use in food products, the extracted whey may be treated in any manner known to the prior art to separate it into its different components or to manufacture by-products. For example, the improved whey may be separated into its protein and lactose and these products further purified. Since the materials producing a disagreeable flavor have already been removed, the products obtained from the whey are of higher quality and are suitable for incorporation into food products.

It is therefore an object of the present invention to provide a simple process of treating whey to remove its objectionable characteristic flavor.

Another object of the invention is to provide a process of producing whey having a clean, slightly sweet flavor suitable for incorporation into food products.

A further object of the invention is to provide a process of treating whey in which aqueous acetone is employed to extract materials from the whey which produce a disagreeable flavor.

Other objects and advantages of the invention will appear from the following description of the preferred process of the present invention.

The present invention may be employed to treat whey from any suitable source; for example, whey obtained as a by-product from the manufacture of substantially any type of cheese, such as cottage cheese, Cheddar cheese, Swiss cheese, etc., or from processes involving the recovery of casein from skimmed milk, may be employed in the present invention. Such whey will usually have a solid content ranging from 5.5% to 7%, the remaining portion of the whey being water. The solid content of the whey on a dry basis will usually range from approximately 70% to 80% lactose, 10% to 20% protein, and 5% to 10% salts, reported as ash.

Before subjecting the liquid whey to the process of the present invention, it is preferred to dry the whey in any suitable manner so as to reduce the water content thereof to a low value, for example, between 2% and 10%, and preferably between 2% and 5%. The whey may be dried in any known or suitable manner, such as spray drying, drying on rolls, or a combination of such drying operations, such as partial spray drying or drying in vacuum pans to concentrate the whey, followed by drying on rolls. Such drying operations can easily be carried on in small plants and the resulting dried whey transported to a central plant for further treatment. The dried whey is preferably reduced to a powder by grinding prior to the extraction step, if the nature of the drying operation does not directly produce a powder.

If the entire process of drying and extraction is carried out in the same plant, it is unnecessary to dry the whey to a low water content as a substantial amount of water, for example, 25%, may be left in the whey and commercial acetone having a low water content employed to extract the concentrated whey.

When extracting dried whey, the preferred process is to employ commercial acetone containing approximately 30% water, i. e., 7 parts of acetone to 3 parts of water, although the concentration of the acetone solution may vary from approximately 60% to 80% on a weight basis, i. e., the amount of water may vary approximately 20% to 40%. The amount of acetone solution may also vary over a considerable range, for example, from approximately 5 to 12 parts of solution to 1 part of dried whey on a weight basis. In extracting concentrated whey having a substantial water content, acetone having a low water content may be employed and the amount of acetone and water added to the concentrated whey adjusted so as to produce an extracting solution within the ranges above mentioned.

As a specific example of a process in accordance with the present invention, a whey was pasteurized as soon as it was removed from the cheese and then dried on rolls to a water content of approximately 3.8%. The original whey contained approximately 93% water. The dried whey solids on a dry basis contained 78% lactose, 13.6% protein, and 8.4% ash. This dried material was extracted with an acetone-water mixture containing 7 parts of acetone and 3 parts of water by weight to 1 part of dried whey. Analysis of the extract showed that the acetone extraction removed 1.6% lactose, 1.1% ash, and 0.8% protein from the dried whey, the percentages being on the basis of the total dried whey. This extract had a bitter, caramelized, and very salty flavor and contained the unidentified materials producing the objectionable flavor in the original whey. It is to be noted that the present process is concerned with treatment of the whole whey solids and that it is not concerned with merely extracting fats from such solids, as the aqueous acetone of the present invention is not suitable for the extraction of fats.

The extracted whey cake was dried in a tray dryer and then ground. The powder had a light creamy color and was easily suspended in water and had a clean and slightly sweet flavor. The resulting product contained approximately 79.2% lactose, 7.6% ash, and 13.2% protein, on a dry basis.

The product produced as above described is suitable for direct incorporation into food products and as an ingredient of pharmaceutical preparations. It is also an improved raw material for the production of by-products from whey. The extraction with acetone also removed from the dried whey some of the substances which tend to retard crystallization of lactose from concentrates during the manufacture of lactose from whey. This makes it very much easier to separate the whey into its various components. For example, the lactalbumin was separated from the whey by adjusting a 20% suspension in water of the dried extracted whey to a pH of 4.7 using hydrochloric acid, boiling, and then filtering. A clear filtrate was obtained. Lactose may be recovered from the above filtrate by any of the known processes for recovering lactose from whey.

From the above description of the invention, it is apparent that I have provided a simple process for removing the undesirable flavor-imparting materials from whey so as to render it or its by-products particularly suitable for incorporation into food products. The process is particularly applicable to recovering high quality whey solids from the whey produced in small cheese factories. Such small plants cannot profitably manufacture by-products nor, prior to the present invention, could they otherwise utilize their whey. However, drying equipment for whey is relatively inexpensive and the whey in small plants can be readily pasteurized and dried, for example, on a drum dryer. This whey may then be transported without prohibitive costs to a central plant for processing in accordance with the present invention to remove the undesirable flavor constituents and, if desired, further treated to manufacture by-products from the improved whey.

I claim:

1. The process of treating whey to remove its characteristic objectionable flavor, which comprises: extracting the whole whey solids at a temperature between approximately 70° and 90° F. with acetone in the presence of 20% to 40% water based on the total weight of the acetone and water employed, separating the acetone containing a small amount of compounds of objectionable flavor from the solids, and recovering the whey solids insoluble in said acetone and water.

2. The process of treating whey to remove its characteristic objectionable flavor, which comprises: drying said whey to recover a dried solid material, extracting the dried whey at a temperature between approximately 70° and 90° F. with acetone containing water in an amount between approximately 20% and 40% by weight, whereby a small amount of compounds containing objectionable flavor are removed by the aqueous acetone, and drying the whey solids which are insoluble in said acetone and water.

3. The process of treating whey to remove its characteristic objectionable flavor, which comprises: drying said whey to remove a dried solid material, admixing the dried whey solids in powdered form with aqueous acetone containing between approximately 20% and 40% water by weight and in an amount ranging between approximately 5 and 12 parts of aqueous acetone to 1 part by weight of whey solids, maintaining the temperature of the resulting mixture between approximately 70° and 90° F., separating the aqueous acetone containing a small amount of compounds of objectionable flavor from whey solids insoluble therein, and drying the insoluble whey solids to produce a light colored product having an improved flavor.

SUE C. STEVENS.

REFERENCES CITED

The following references are of record in the file of this patent:

UNITED STATES PATENTS

| Number | Name | Date |
| --- | --- | --- |
| 735,148 | Ramage | Aug. 4, 1903 |
| 735,149 | Ramage | Aug. 4, 1903 |
| 1,144,829 | Fendler | June 29, 1915 |
| 2,116,931 | Leviton | May 10, 1938 |
| 2,129,222 | Leviton | Sept. 6, 1938 |
| 2,390,074 | Cohn | Dec. 4, 1945 |

FOREIGN PATENTS

| Number | Country | Date |
| --- | --- | --- |
| 3,105 | Great Britain | Feb. 4, 1893 |
| 546,447 | Great Britain | July 14, 1942 |